Figure 1:
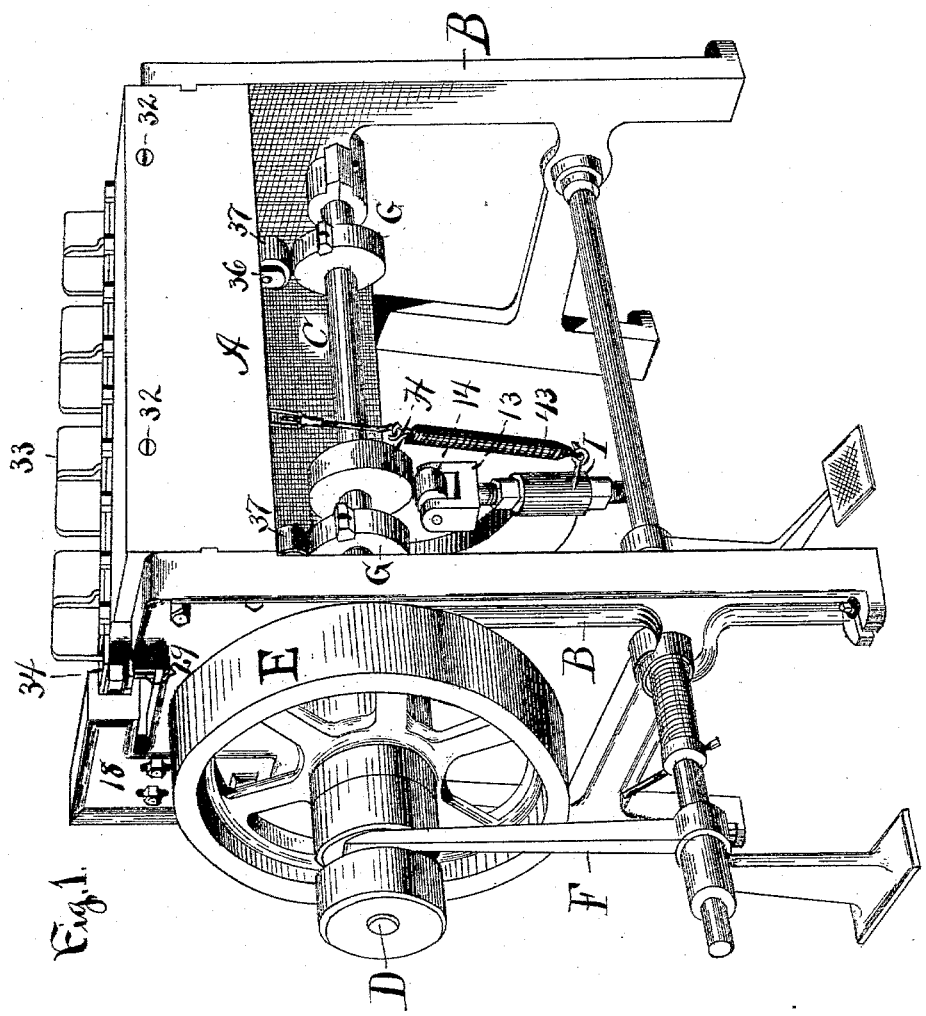

(No Model.) 6 Sheets—Sheet 1.

W. J. BAYRER.
MACHINE FOR CUTTING AND BENDING SHEET METAL.

No. 490,060. Patented Jan. 17, 1893.

Witnesses
Brayton S. Lewis.
Edward W. Bush

Inventor,
William J. Bayrer
By James Shepard
Atty.

(No Model.) 6 Sheets—Sheet 2.
W. J. BAYRER.
MACHINE FOR CUTTING AND BENDING SHEET METAL.
No. 490,060. Patented Jan. 17, 1893.
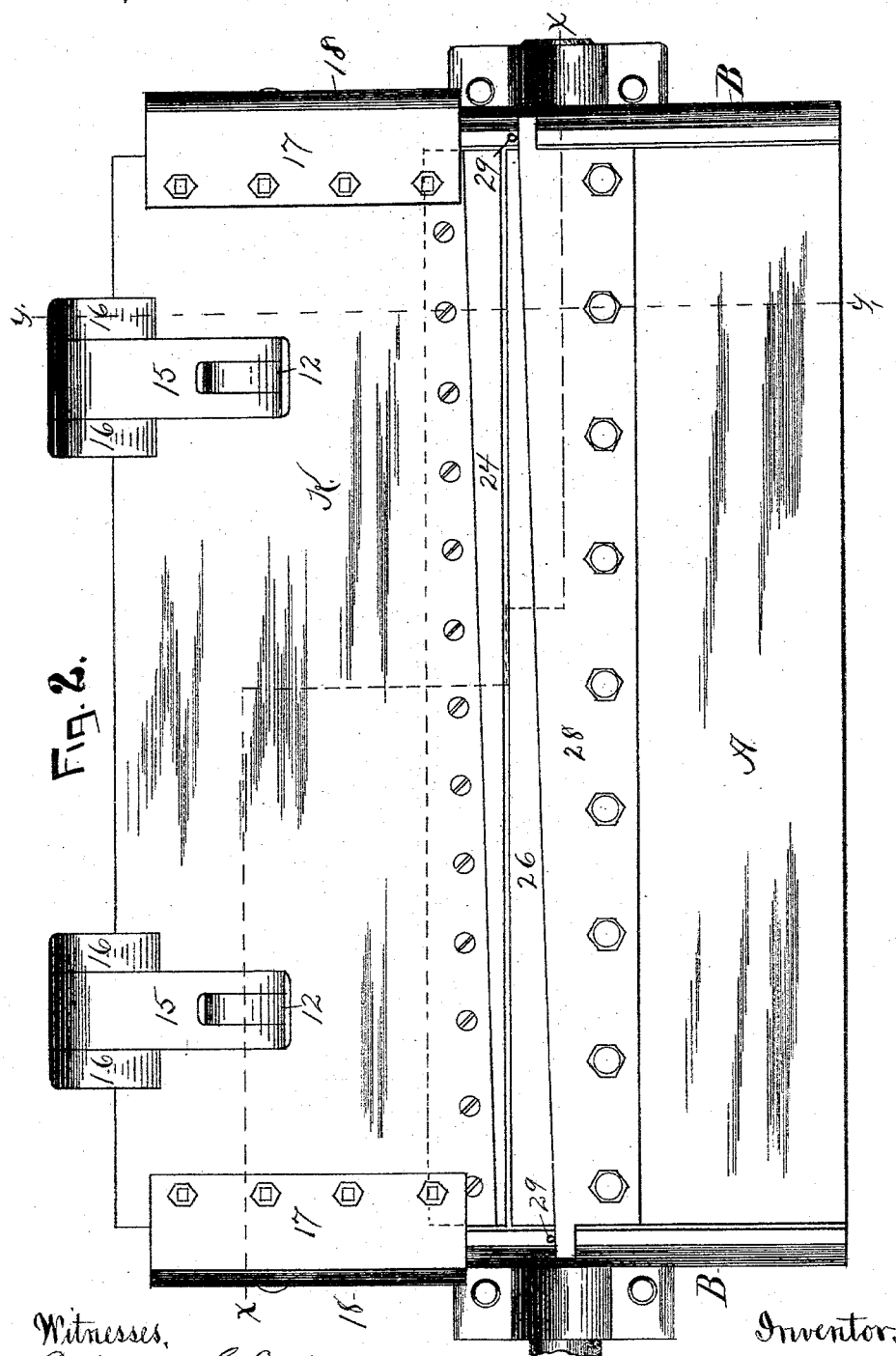
Witnesses,
Brayton S. Lewis
Edward W. Bush,
Inventor,
William J. Bayrer
By James Shepard
Atty.

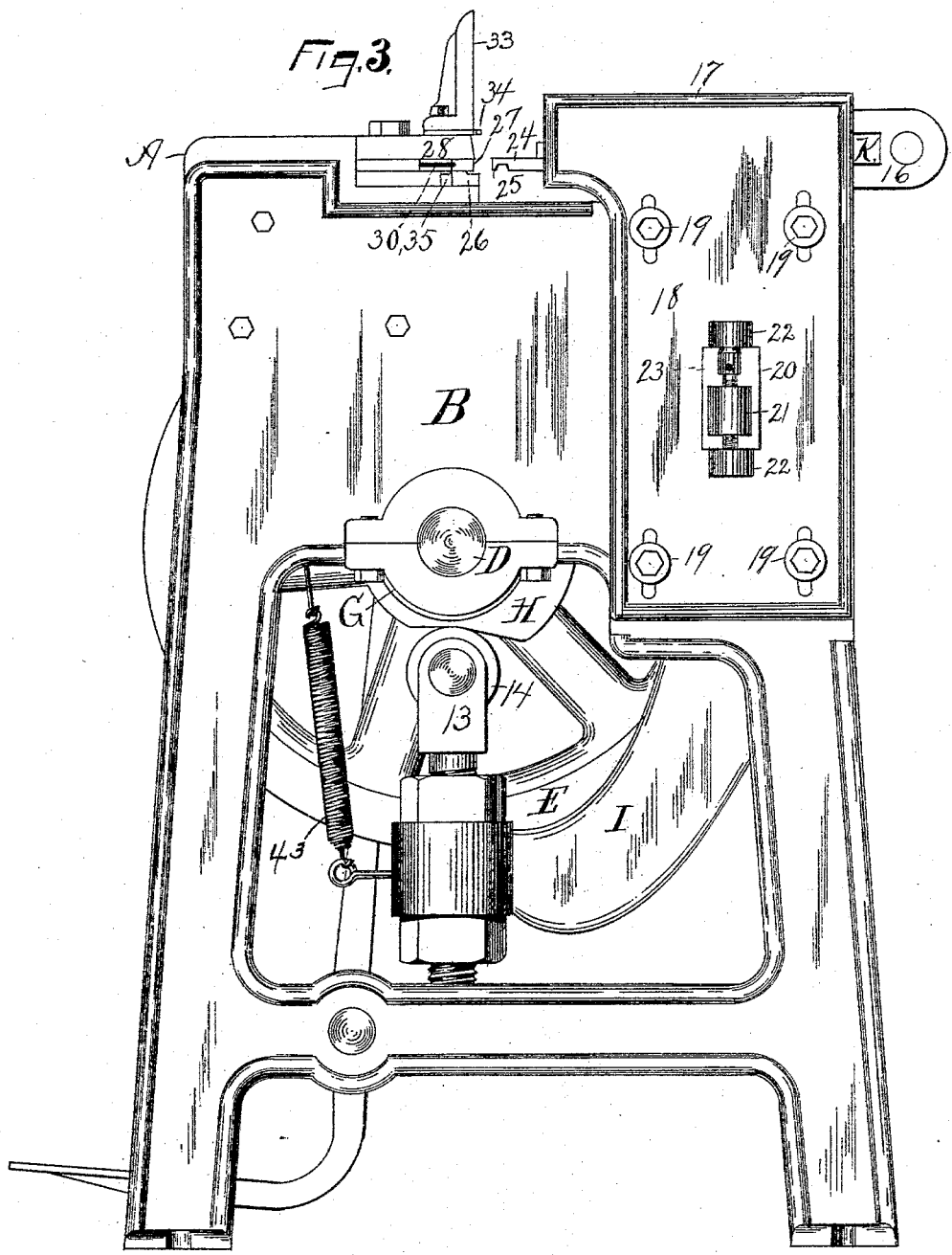

(No Model.) 6 Sheets—Sheet 4.
W. J. BAYRER.
MACHINE FOR CUTTING AND BENDING SHEET METAL.
No. 490,060. Patented Jan. 17, 1893.
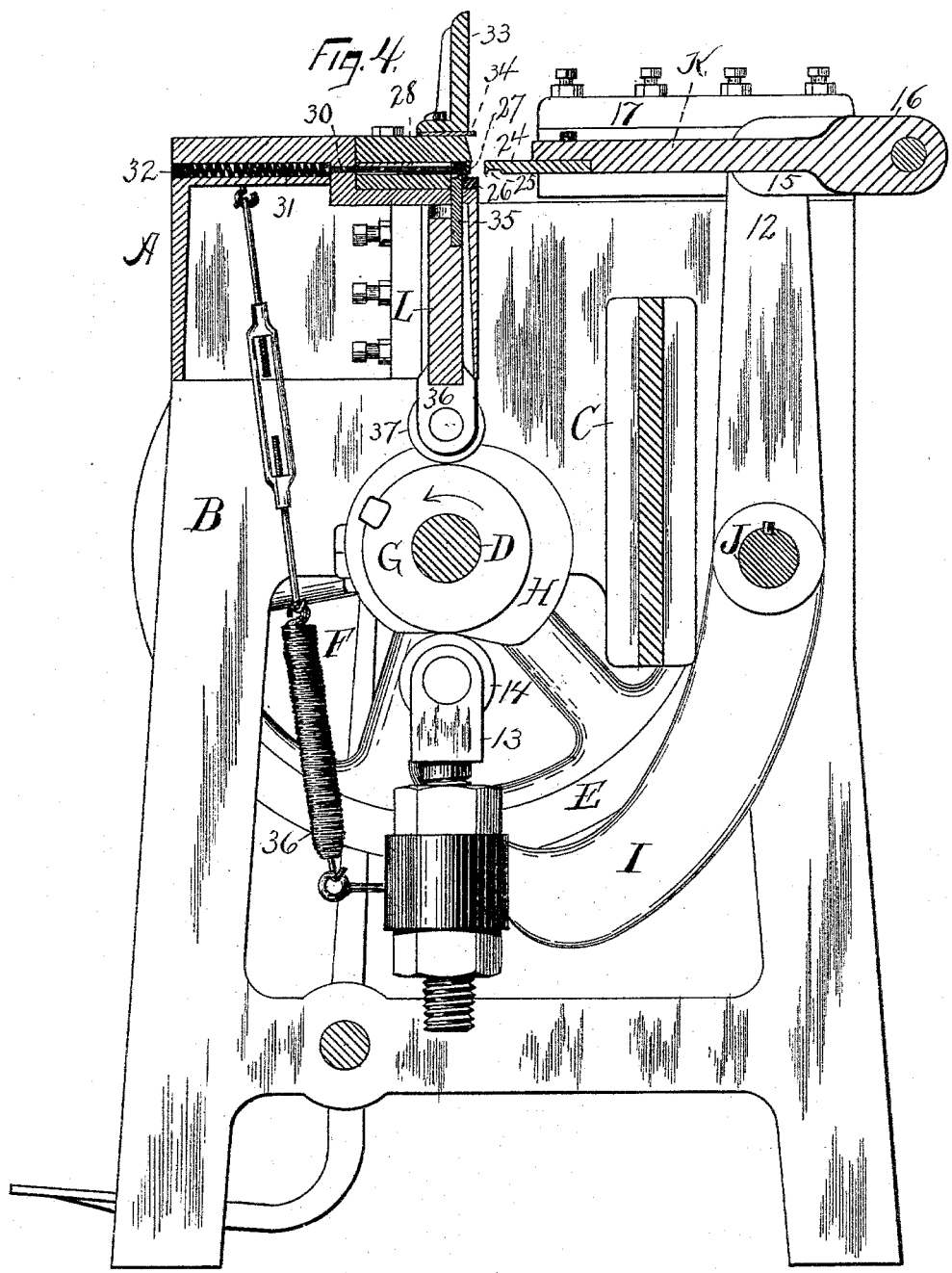
Witnesses.
Brayton S. Lewis.
Edward W. Bush,
Inventor.
William J. Bayrer
By James Shepard
Atty.

(No Model.) 6 Sheets—Sheet 5.
W. J. BAYRER.
MACHINE FOR CUTTING AND BENDING SHEET METAL.
No. 490,060. Patented Jan. 17, 1893.
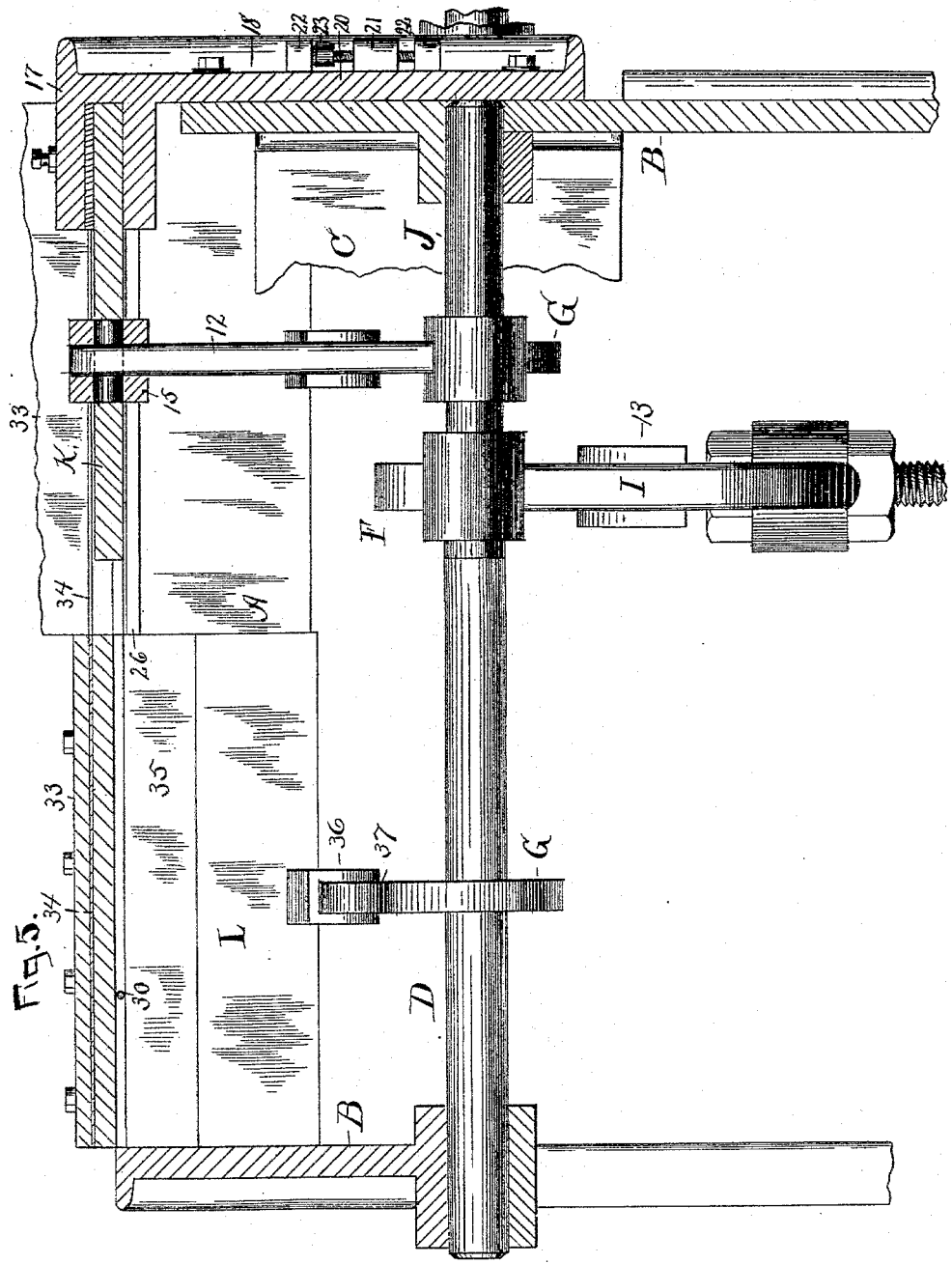
Witnesses
Brayton L. Lewis
Edward W. Bush
Inventor,
William J. Bayrer
By James Shepard
Atty.

(No Model.) 6 Sheets—Sheet 6.
W. J. BAYRER.
MACHINE FOR CUTTING AND BENDING SHEET METAL.
No. 490,060. Patented Jan. 17, 1893.
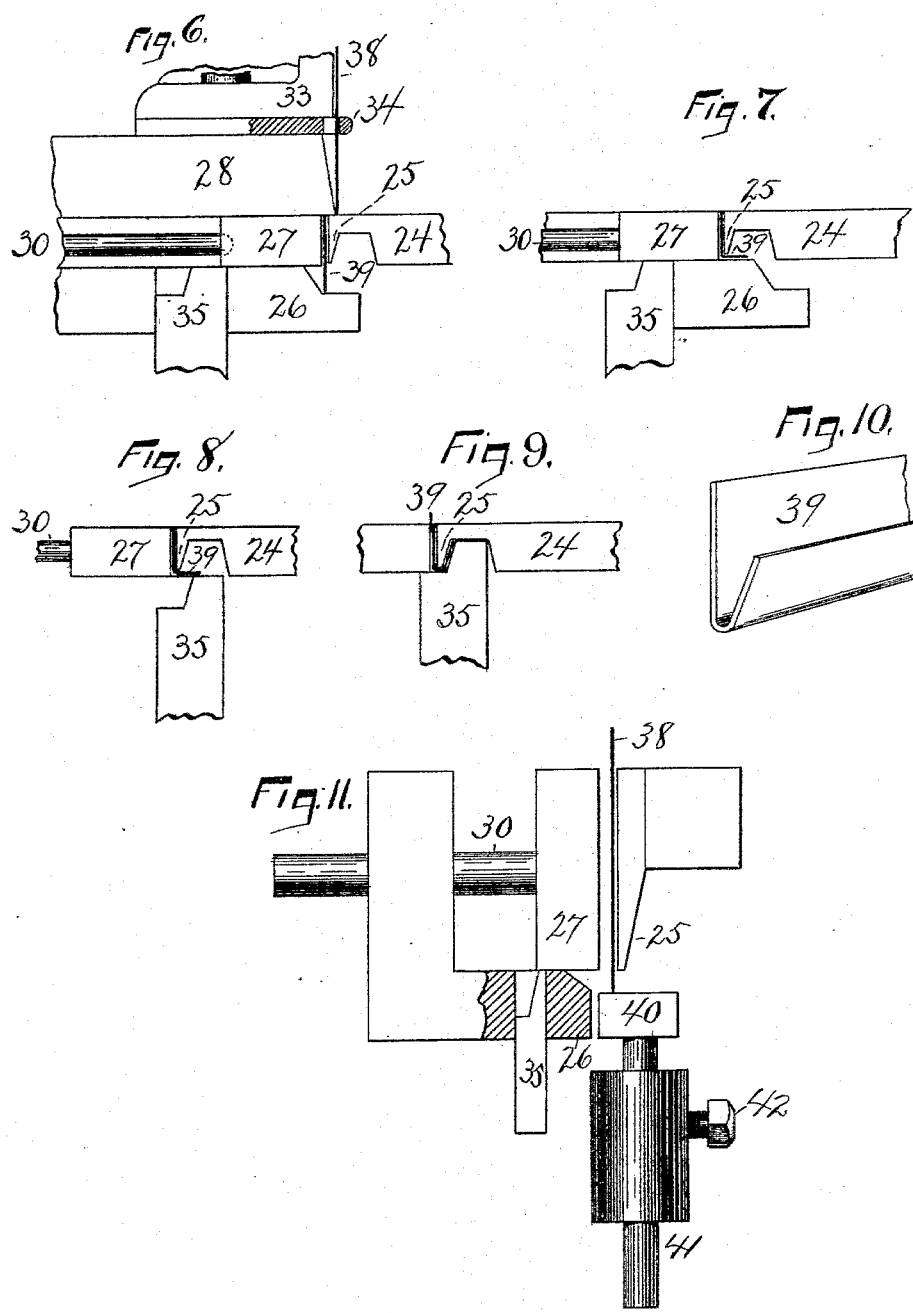

UNITED STATES PATENT OFFICE.

WILLIAM J. BAYRER, OF SOUTHINGTON, CONNECTICUT, ASSIGNOR TO THE PECK, STOW & WILCOX COMPANY, OF SAME PLACE.

MACHINE FOR CUTTING AND BENDING SHEET METAL.

SPECIFICATION forming part of Letters Patent No. 490,060, dated January 17, 1893.

Application filed August 3, 1892. Serial No. 441,994. (No model.)

*To all whom it may concern:*

Be it known that I, WILLIAM J. BAYRER, a citizen of the United States, residing at Southington, in the county of Hartford and State of Connecticut, have invented a certain new and Improved Machine for Cutting and Bending Sheet Metal, of which the following is a specification.

My invention relates to machines for cutting and bending sheet metal; and the chief objects of my improvements are to combine a cutting and bending machine in one, and to form an improved power bending machine.

In the accompanying drawings, Figure 1 is a perspective view of my machine. Fig. 2 is a plan view of the same, with some of the parts removed. Fig. 3 is a side elevation. Fig. 4 is a transverse vertical section on the line $y\,y$ of Fig. 2. Fig. 5 is a longitudinal vertical section on the angular line $x\,x$ of Fig. 2, thereby showing portions of the machine in three different vertical planes. Some of the parts within said planes being shown in elevation, while the tie C is represented as partly broken away. Fig. 6 is an enlarged detailed view in side elevation of the principal working parts. Figs. 7, 8 and 9 are like views of some of the same parts at other positions of their operation. Fig. 10 is a still further enlarged perspective view of the strip as cut and bent by my machine, and Fig. 11 is a somewhat modified side elevation (partly in section) of the principal parts of the machine as adapted for bending without cutting.

The frame is composed of a main or body portion A, legs B and tie C.

D designates the main shaft provided with a driving pulley E and any suitable clutch mechanism F. Said shaft is also provided with cams G G and H. The cam H acts upon the vibrating arm I to operate the rock shaft J, to which shaft I attach arms 12. I prefer to place an adjustable block 13 and roller 14 on the end of the arm I for being acted upon directly by the cam H, but it is of course evident that a rigid or non-adjustable arm might be used. The arms 12 on the rock shaft J are connected by their upper ends with short links or pitmen 15, the opposite ends of said pitmen being connected to the ears 16 of the horizontal shear slide K. Said shear slide is mounted in suitable ways 17 formed on the upper end of the vertically adjustable end pieces 18 which are secured to the upper ends of the legs B. These end pieces are secured to said legs by bolts 19 which pass through vertical slots in said end pieces into the legs. The middle portion of the end pieces is left open or slotted as at 20, Fig. 3, through which opening the lug 21 on the leg projects. Above and below the opening 20 there are lugs 22 formed on the said end pieces and the screw 23 passes through the lug 21 with both of its ends resting on the lugs 22, whereby when the bolts 19 are loosened, turning the screw 23 will raise or lower the end pieces as may be desired.

The shear slide K has secured to it the combined shear blade and folding plate 24. The inner upper corner of this blade 24 constitutes the shear blade or cutter, while a recess is formed on its under side to convert the lower under corner 25 into a folding plate.

Upon the main portion of the frame A is a rabbeted bed 26 which performs the function of a gage and bender. Immediately above said bed is a horizontally sliding clamp 27 and above said sliding clamp is the fixed shear blade 28. The sliding clamp 27 is stopped from going too far forward by means of the stop pins 29 Fig. 2, whereby when at rest this clamp is stopped with its front edge even with the edge of the stationary shear blade 28. It is continually pressed upon with a tendency to hold it in this position by the spring pins 30 which pins pass through suitable guides in a stationary part of the machine and extend into the chamber for the spring 31 as shown in Fig. 4. This chamber is formed by boring a hole in the part A and closing the same by a screw plug 32, whereby the spring has one end resting on said plug and the other upon the head of the pin 30 for forcing the clamp toward its stops. The ends of these pins where they slightly enter one side of the clamp 27 are slightly rounded so as to permit the clamp to rock thereon. Above the stationary shear blade 28 is a flange or work support 33 having a slotted holding plate 34 at its base through which a sheet of metal is passed vertically for presenting it to the machine.

Moving in the vertical ways within the part A of the frame is a riser L carrying at its upper end the bending plate 35. This riser is provided with suitable ears 36 carrying rollers 37 which rest upon the cams G on the main shaft D. The spring 43 is connected with the arm I of the rock shaft J by one end and to a stationary support at the other end for holding said arm I against its cam H. A sheet of metal 38, Fig. 6, is passed down through the holding plate 34 with its lower edge resting upon the upper face of the rabbeted bed 26. The machine being then started with its main shaft D moving in the direction indicated by the dart in Fig. 4 carries the cam H so as to depress the lower end of the arm I, thereby moving the rock shaft J and arms 12 to carry the horizontal shear slide K forward, when the combined shear blade and folding plate acts to cut off a strip of metal 39 from the plate 38, while at the same time it presses said strip 39 so as to clamp it between the edge of the moving shear blade and the clamp 27 as shown in Fig. 6. The cam gradually increases so that the continued motion of the shaft carries the moving shear blade and the clamp gradually along and that portion of the strip 39 which projects from below the moving shear plate and clamp is caught by the shoulder of the rabbeted bed and prevented from moving with the clamp, whereby the strip of metal is bent into an L shaped form as shown in Figs. 7 and 8. When the parts reach the position shown in Fig. 8 the roller or bearing point of the arm I will rest upon substantially the highest portion of the cam H (measured diametrically) said portion being preferably concentric with the shaft D. The cams G then come quickly into action for moving the riser L upwardly, thereby carrying the bending plate 35 from the position shown in Fig. 8 to that shown in Fig. 9 and bending the strip of metal from its L shape into the form of a finished lock or bend as shown in Figs. 9 and 10. The cam H then presents its lowest portion to the bearing point of the arm I and said arm is raised again into the position shown in Fig. 4 thereby moving rock shaft J and the horizontal shear slide K back into position ready to repeat the operation. This shear slide K is mounted on the adjustable end pieces in order to enable it to be properly adjusted with reference to the fixed shear blade 28.

It is obvious that many of the details of the machine may be varied without departing from the spirit of my invention as other mechanism for operating the parts shown in Figs. 6 to 9 inclusive to move them in the manner described may be substituted for that which I have shown and the parts still have the same mode of operation.

While I prefer for special work to employ a cutter in connection with the bender, it is obvious that substantially the same parts may be used as a power bending machine without the employment of the cutters. In Fig. 11 I have illustrated the said parts as so arranged and have given said parts the same reference numerals. I have, however, made the folding plate 25 of a little greater vertical depth so that it may be used for turning locks of different widths, whereas the machine as shown in the other figures is designed for turning a lock of a given width and therefore it was unnecessary to show an excess in the vertical width of the folding blade.

In order to arrange for turning locks of different widths I make the gaging ledge 40 on the rabbeted bed 26 adjustable up and down on a standard 41 where it is held in position by the set screw 42. With the exception of this adjustability, these parts are substantially the same as before described and are adapted to be placed in the same machine and operated by the means therein shown and described so as to perform the bending of the strip in precisely the same way.

I claim as my invention,

1. The combination of a gaging and bending bed, the fixed shear blade, the combined moving shear blade and folding plate arranged to move over said gaging bed, the sliding clamp arranged to abut against and move with the advance side of said combined moving shear blade and folding plate, the bending plate 35, and operating mechanism, substantially as described and for the purpose specified.

2. The combination of a gaging and stationary bending bed, the bending plate 35 moving with the riser and arranged on that side of said bed which is opposite the gaging ledge and bending face thereof, the folding plate having its broad advance face parallel to the movement of said bending plate, the movable clamp arranged to abut against the advance face of said folding plate, said folding plate and clamp being mounted to move from a point over the gaging ledge on one side of said bed to a point over said bending plate on the opposite side of said bed and operating mechanism substantially as described and for the purpose specified.

3. The combination of the riser L carrying the bender plate 35, the gaging and bending bed adjacent to said bending plate, the spring pressed clamp 27 arranged to move over said gaging bed and bender plate, the shaft D carrying cams for lifting said riser L, a cam H also mounted on said shaft, the rocking arm I, the rock shaft J, arms 12 and horizontal slide K carrying a bending blade 25, substantially as described and for the purpose specified.

WILLIAM J. BAYRER.

Witnesses:
HIAL S. GRANNIS,
FRANCIS S. STOW.